(12) United States Patent
Ogasawara

(10) Patent No.: US 6,445,270 B1
(45) Date of Patent: Sep. 3, 2002

(54) ELECTROMAGNETIC INDUCTION CONNECTOR

(75) Inventor: Kazuyoshi Ogasawara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/698,162

(22) Filed: Oct. 30, 2000

(30) Foreign Application Priority Data

Oct. 29, 1999 (JP) ............................................. 11-309429

(51) Int. Cl.[7] ............................................... H01F 27/28
(52) U.S. Cl. ...................................... 336/182; 336/212
(58) Field of Search ................................. 336/216, 212, 336/182

(56) References Cited

U.S. PATENT DOCUMENTS

| | | | | |
|---|---|---|---|---|
| 3,201,731 A | * | 8/1965 | Robert et al. ................ | 336/217 |
| 5,422,619 A | * | 6/1995 | Yamaguchi et al. ......... | 336/184 |
| 6,052,048 A | * | 4/2000 | Cattaneo ...................... | 336/178 |

FOREIGN PATENT DOCUMENTS

| | | | | |
|---|---|---|---|---|
| JP | 61-174607 | 8/1986 | ........... | H01F/23/00 |

* cited by examiner

Primary Examiner—Lincoln Donovan
Assistant Examiner—Tuyen T. Nguyen
(74) Attorney, Agent, or Firm—Sughrue Mion, PLLC

(57) ABSTRACT

An electromagnetic induction connector 21 includes a primary core 27 and a secondary core 29 having a pair of opposing leg portions 27a, 27b and a pair of opposing leg portions 29a, 29b which are disposed in a manner that the tip end surfaces s of the leg portions 27a, 27b and the tip end surfaces s of the leg portions 29a, 29b are opposed, respectively; a primary coil 33 which is wound around the one leg portion 27a of the primary core 27 and extended from the tip end surface s of the leg portion 27a to simultaneously cover the tip end surface s of the one leg portion 29a of the secondary core 29 disposed in opposite thereto; and a secondary coil 35 which is wound around the other leg portion 29b of the secondary core 29 and extended from the tip end surface s of the leg portion 29b to simultaneously cover the tip end surfaces of the one leg portion 27b of the primary core 27 disposed in opposite thereto.

5 Claims, 4 Drawing Sheets

ELECTROMAGNETIC INDUCTION CONNECTOR

BACKGROUND OF THE INVENTION

1. Technical Field

The present invention relates to an improvement of an electromagnetic induction connector which transmits electric power in a non-contact manner by the electromagnetic induction.

2. Related Art

Connectors etc. such as a socket plug, a such cable connector are used in a manner that they are connected so as to transmit electric power or electric signals when needed and disconnected when not needed. Almost of the such conventional connectors are arranged to transmit electric power by directly contacting electric conductive pieces. Thus, such a type of conventional connectors likely cause a trouble such as a contact failure, an electric shock, a leak etc. Further, such a type of conventional connectors etc. have a decisive drawback that these connectors can not be used in the water or a place such as a bath where the connectors may be watered due to the possibility of the occurrence of a leak.

The electromagnetic inductive coupling type connector arranged to obviate such a drawback is disclosed in Japanese Patent Publication Sho. 61-174607A, for example. FIG. 7 is a sectional view of the electromagnetic inductive coupling type connector disclosed in the publication. In the figure, a reference numeral 1 depicts U-shaped iron cores around which windings 3 are wound to constitute halves of a transformer, respectively. A reference numeral 5 depicts codes connected to the coils. A reference numeral 7 depicts casings made of material (for example, composite resin) which is electrically insulative and capable of transmitting magnetic force lines.

FIG. 7 is a diagram showing a state where connectors are separated. Upon use, a connector 9 and a connector 11 are coupled. In the combined state of the connectors, when AC voltage is applied from the code 5 of one of the connectors 9 and 11, the electric energy is transmitted to the other connector due to the magnetic induction. Since the transmission of the electric energy is performed by the magnetic induction, the electric energy can be transmitted without any trouble even if the casings 7 is made of electric insulator.

Thus, since the transmission of the electric energy is performed without directly contacting electric conductive pieces, a trouble such as a contact failure, an electric shock, a leak can be surely prevented.

However, the above electromagnetic induction connector is arranged in a manner as shown by a schematic diagram of FIG. 8 that the coils 3 are wound around the coupling portions 1a of the U-shaped iron cores 1, and upon coupling the connectors, the opposing end faces of two pairs of opposed leg portions 1b, 1b of the cores 1 are disposed so as to oppose to each other as shown in FIG. 9(A) thereby to form a path of the magnetic flux. Thus, there arises a problem that the transmission efficiency changes greatly depending on the abutment accuracy between the end faces of the two pairs of leg portions 1b, 1b.

This is because when a deviation arises between the abutment portions of the opposed end surfaces of the two pairs of opposed leg portions 1b, 1b as shown in FIG. 9(B), magnetic fluxes B leak from the deviated portions A and hence the magnetic induction efficiency is degraded by the leaked magnetic fluxes. In contrast, in order to improve the abutment accuracy so as to reduce the abutment deviation, it is required to improve the manufacturing accuracy of the connectors, which results in the raising of the cost of the connectors.

SUMMARY OF THE INVENTION

The invention has been made in view of the above circumstances of the related art, and an object of the invention is to provide an electromagnetic induction connector which is cheap and can secure a high transmission efficiency regardless of the abutment accuracy of core portions.

In order to attain the above object, an electromagnetic induction connector includes:

a primary core including at least two first legs, each of the first legs defining a first tip end surface;

a secondary core including at lease two second legs, each of the second legs defining a second tip end surface opposed to said corresponding first tip end surface;

a primary coil wound around one of the first legs, extended from the first tip end surface of the one of the first legs and covering one of the second tip end surfaces; and a secondary coil wound around the other second leg, extended from the second tip end surfaces of the other second legs and covering the other first tip end surface.

According to the electromagnetic induction connector thus arranged, since the coils wound around the leg portions of the cores are provided so as to explode from the tip end surfaces of the leg portions, when the primary and secondary cores are disposed so as to oppose to each other upon coupling the connectors, the partner-side leg portions are inserted within the coils thus extended. Thus, the tip end surfaces of the leg portions around which the coils are wound and the tip end surfaces of the partner-side leg portions disposed in opposite thereto (that is, gap portions forming a core discontinuous surface) are simultaneously surrounded by the coils. Accordingly, since the influence due to the leakage magnetic flux is reduced, the electromagnetic induction efficiency between the primary coil and the secondary coil can be improved. Further, since the influence due to the leakage magnetic flux is reduced without increasing the abutment accuracy, the manufacturing accuracy of the connectors may be low and so the manufacturing cost of the connector becomes low.

In the electromagnetic induction connector of the invention, the one of first legs is longer than the other first leg, the other second leg is longer than the one of second legs.

According to the electromagnetic induction connector thus arranged, such a configuration that the leg portions of the partner-side connectors are inserted within the coils can be attained easily by merely combining a pair of the connectors. In other words, if coils are provided around the leg portions with the long protruded lengths, the tip end surfaces of the leg portions around which the coils are wound are disposed so as to oppose to the tip end surfaces of the partner-side leg portions within the partner-side connectors at the time of combining the connectors. Thus, in this case, it is required to provide a mechanism capable of moving the coils to the position. Further, if the coils are provided so as to extend from the tip end surfaces of the leg portions with the long protruded lengths, it is meaningless since the lengths of the cores merely become longer. In contrast, according to the configuration of the invention, the pair of leg portions of each of the cores are formed to have different lengths, and the leg portions with the long protruded lengths are disposed so as to oppose to the leg portions with the short protruded lengths. Thus, it becomes possible easily to form such a configuration for inserting the leg portions within the coils, without providing a coil moving mechanism nor meaninglessly making the lengths of the leg portions of the cores long. The electromagnetic induction connector further includes:

a housing covering the primary core so that the first tip end surface of the longer first leg is accommodated in the housing; and a housing covering the second core so that the second tip end surface of the longer second leg is accommodated in the housing.

According to the electromagnetic induction connector thus arranged, the tip end surfaces of the leg portions with the long protruded lengths are housed within the housings. of course, the tip end surfaces of the leg portions with the short protruded lengths are housed within the housings. That is, the cores do not protrude from the housings. Thus, since the cores thus protruded do not contact to other members, the cores can be prevented from being damaged and also other members can be prevented from being damaged.

An electromagnetic induction connector of the invention includes:

a primary core including at least two first legs, each of the first legs defining a first tip end surface;

a secondary core including at lease two second legs, each of the second legs defining a second tip end surface opposed to the corresponding first tip end surface;

a primary coil wound around and movable with respect to one of the first legs; and a secondary coil wound around and movable with respect to one of the second legs, wherein the primary coil covers the second tip end surface of the other second leg by moving the primary coil toward the other second leg, the secondary coil covers the first tip end surface of the other first leg by moving the secondary coil toward the other first leg.

According to the electromagnetic induction connector thus arranged, since the coils are provided so as to move freely with respect to the leg portions, after coupling the connectors, the coils are moved and protruded from the tip end surfaces to simultaneously cover the tip end surfaces of the partner-side leg portions. Thus, it is not necessary to form the leg portions of each core to have the difference lengths. As a result, since the leg portions of each core can be formed to have the same protruded length, the coupling end surfaces of the connectors to be coupled can be formed as flat surfaces.

DETAILED DESCRIPTION OF PREFERRED EMBODIMENT

The electromagnetic induction connector according to preferred embodiments of the invention will be explained with reference to the accompanying drawings.

Figure 1:
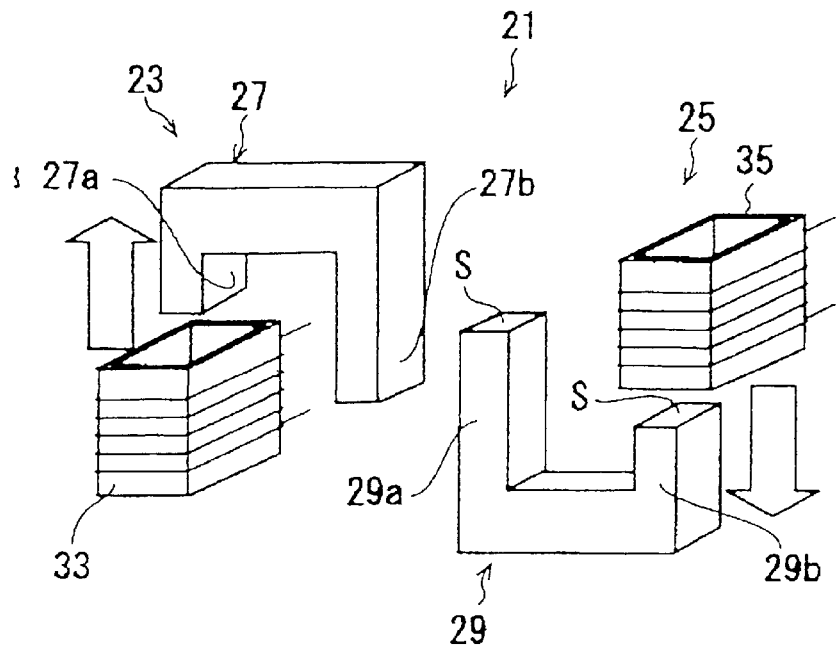
FIG. 1 is an exploded perspective view showing a main portion of the electromagnetic induction connector according to a first embodiment of the invention.
Figures 2A, 2B:
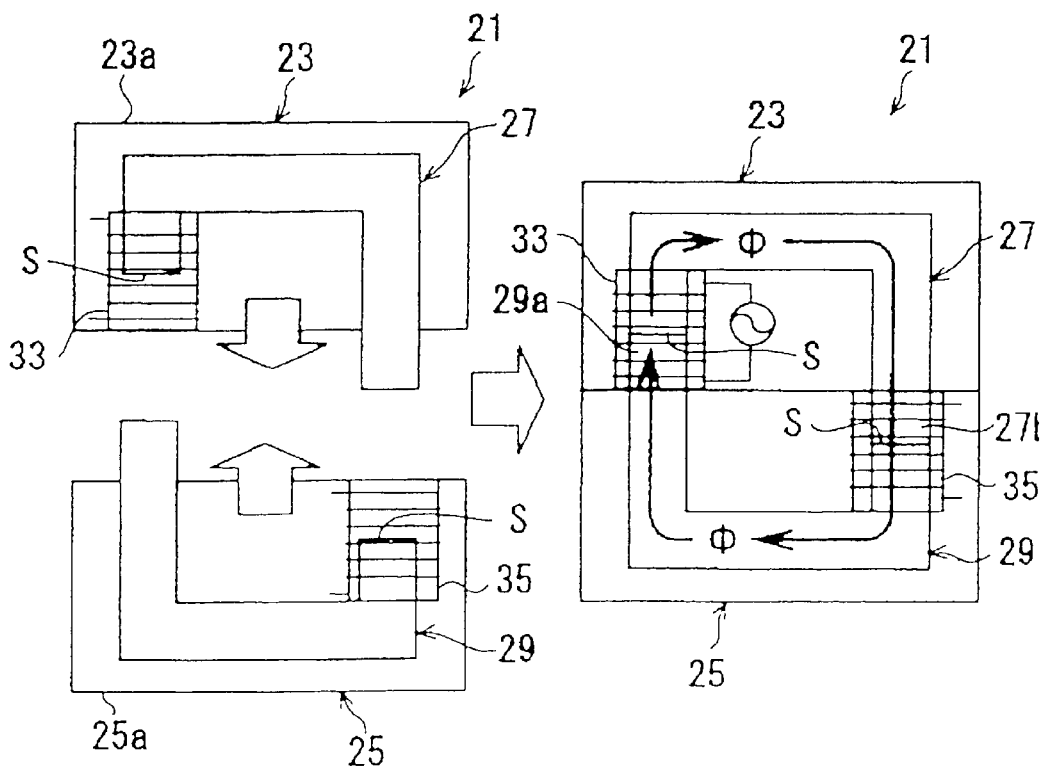
FIG. 2(A) and FIG. 2(B) are diagrams for explaining states where connectors of the electromagnetic induction connector of FIG. 1 have not been combined and have been combined, respectively.

FIG. 1 is an exploded perspective view showing a main portion of the electromagnetic induction connector according to the first embodiment of the invention. FIG. 2(A) and FIG. 2(B) are diagrams for explaining states where connectors of the electromagnetic induction connector of FIG. 1 have not been combined and have been combined, respectively. FIG. 3(A) and FIG. 3(B) are diagrams for explaining states where connectors of a modified example that the electromagnetic induction connector of FIG. 1 have not been combined and have been combined, respectively.

An electromagnetic induction connector 21 is formed by a first connector 23 and a second connector 25 to be coupled to each other. A first core 27 is housed within the housing 23a of the first connector 23. A second core 29 is housed within the housing 25a of the second connector 25.

The first core 27 and the second core 29 have a pair of protruded opposing leg portions 27a, 27b and a pair of protruded opposing leg portions 29a, 29b, respectively, and each of these cores are formed in a U-shape. In the first core 27, the one leg portion 27a is formed to have a protruded length shorter than that of the other leg portion 27b. In the second core 29, the one leg portion 29a is formed to have a protruded length longer than that of the other leg portion 29b.

The leg portions 27a, 27b and the leg portions 29a, 29b are disposed in a manner that the tip end surfaces of the former leg portions are opposed to the tip end surfaces of the latter leg portions when the first connector 23 and the second connector 25 are coupled. It is described that the tip end surfaces of the two pairs of the leg portions are disposed to oppose to each other because there may be a case that an insulator is disposed between the tip end surfaces of the two pairs of the leg portions. Thus, when there is no insulator between the tip end surfaces of the two pairs of the leg portions, the tip end surfaces of the one pair directly contact to the tip end surfaces of the other pair. As a result, the leg portions 27a, 27b of the first core 27 formed in a U-shape are coupled to the leg portions 29a, 29b of the second core 29 formed in a U-shape, respectively, to form a magnetic core of a rectangular frame shape shown in FIG. 2(b).

A primary coil 33 is wound around the one leg portion 27a of the first core 27. As shown in FIG. 2, a part of the primary coil 33 is extended outward from the tip end surface s of the one leg portion 27a. A secondary coil 35 is wound around the other leg portion 29b of the second core 29. As shown in FIG. 2, a part of the secondary coil 35 is extended outward from the tip end surface s of the other leg portion 29b. Each of the primary coil 33 and the secondary coil 35 wound so as to protrude from the tip end surfaces S partially forms a hollow portion having no magnetic core therein.

The action of the electromagnetic induction connector 21 thus configured will be explained.

In the electromagnetic induction connector 21, when the first connector 23 is coupled to the second connector 25, as shown in FIG. 2(B), the one leg portion 29a of the second core 29 is inserted into the hollow portion of the primary coil 33 wound around the one leg portion 27a of the first core 27, and further the other leg portion 27b of the primary core 27 is inserted into the hollow portion of the secondary coil 35 wound around the other leg portion 29b of the secondary core 29.

Accordingly, the tip end surface S of the leg portion 27a abuts against the tip end surface s of the leg portion 29a within the hollow portion of the primary coil 33. Also, the tip end surface S of the leg portion 27b abuts against the tip end surface S of the leg portion 29b within the hollow portion of the secondary coil 35. That is, the tip end surfaces S of the one leg portions thus abutted and the tip end surface S of the other leg portions thus abutted are simultaneously surrounded by the primary coil 33 and the secondary coil 35, respectively.

In this coupling state of the connectors, when AC voltage is applied to the primary coil 33 of the first connector 23, the electric energy is transmitted to the secondary coil 35 by the electromagnetic induction according to the magnetic fluxes generated in the primary core 27 and the secondary core 29 thus combined.

In the electromagnetic induction connector 21, since the primary coil 33 and the secondary coil 35 wound around the leg portions of the primary core 27 and the secondary core 29 are provided so as to extend from the tip end surfaces thereof, when the primary core 27 and the secondary core 29 are disposed so as to oppose to each other upon coupling the connectors, the partner-side leg portions are inserted within the primary coil 33 and the secondary coil 35 thus extended.

Thus, the tip end surfaces S of the leg portions around which the primary coil 33 and the secondary coil 35 are wound and the tip end surfaces S of the partner-side leg portions disposed in opposite thereto(that is, gap portions forming a core discontinuous surface) are simultaneously surrounded by the primary coil 33 and the secondary coil 35, respectively. Accordingly, since the influence due to the leakage magnetic flux is reduced, the electromagnetic induction efficiency between the primary coil 33 and the secondary coil 35 can be improved. Further, since the influence due to the leakage magnetic flux is reduced without increasing the abutment accuracy, the manufacturing accuracy of the connectors 23 and 25 may be low and so the manufacturing cost of the connector becomes low.

Since the one leg portion 27a is formed to be short in the primary core 27 and the other leg portion 29b is formed to be short in the secondary core 29, such a configuration that the leg portions of the partner-side connectors are inserted within the coils can be attained easily by merely combining a pair of the primary connector 23 and the secondary connector 25.

In other words, if coils are provided around the leg portions (the leg portion 27b and the leg portion 29a) with the long protruded lengths, when the primary connector 23 and the secondary connector are combined, the tip end surface S of the leg portion 27b and the leg portion 29a around which the coils are wound are disposed so as to oppose to the tip end surfaces S of the partner-side leg portions (the leg portion 27a and the leg portion 29b) within the partner-side connectors. Thus, in this case, it is required to provide a mechanism capable of moving the primary coil 33 and the secondary coil 35 to the position. Further, if the coils are provided so as to extend from the tip end surfaces S of the leg portions (the leg portion 27b and the leg portion 29a) with the long protruded lengths, it is meaningless since the lengths of the cores merely become longer. In contrast, according to the configuration of the embodiment, the pair of leg portions of each of the cores are formed to have different lengths, then the coils are wound around the leg portions 27a, 29b with the short protruded lengths. The leg portions with the long protruded lengths are disposed so as to oppose to the leg portions with the short protruded lengths. Thus, it is possible easily to form such a configuration for inserting the leg portions within the coils, without providing a coil moving mechanism nor meaninglessly making the lengths of the leg portions of the cores long.

Figure 3:
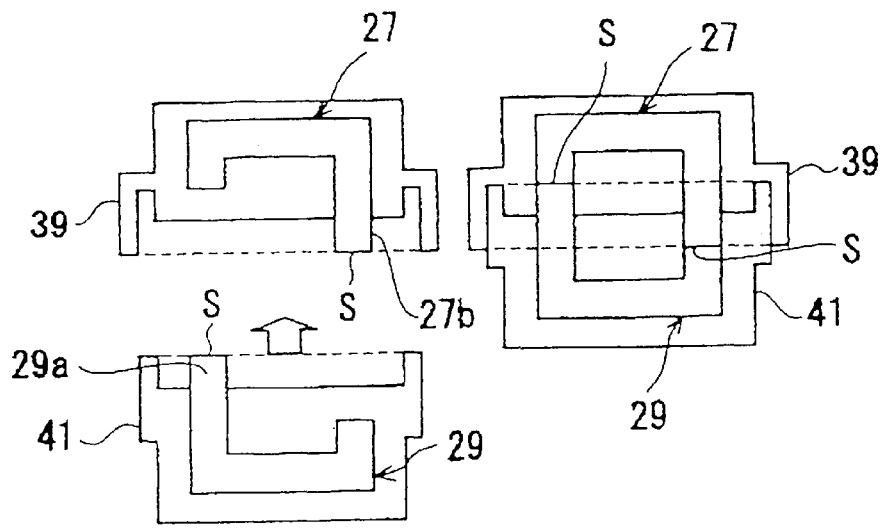
FIG. 3(A) and FIG. 3(B) are diagrams for explaining states where connectors of a modified example of the electromagnetic induction connector of FIG. 1 have not been combined and have been combined, respectively.

In the above electromagnetic induction connector 21, the explanation has been made as to an example where the leg portions (the leg portion 27b and the leg portion 29a) with the long protruded lengths are protruded from the housings 23a, 25a, respectively. However, as shown in FIG. 3, the electromagnetic induction connector according to the invention may be arranged in a manner that the primary core 27 and the secondary core 29 are covered by housings 39, 41 which house therein the tip end surfaces s of the leg portion 27a and the leg portion 29b with the long protruded lengths, respectively.

When employing the housings 39 and 41 thus arranged, the leg portion 27b and the leg portion 29a with the long protruded lengths do not protrude from the housings 39 and 41, respectively, so that the cores can be protected. Thus, since the cores do not contact to other members, the cores can be prevented from being damaged and also other members can be prevented from being damaged.

The electromagnetic induction connector according to the second embodiment of the invention will be explained.

Figures 4A, 4B:
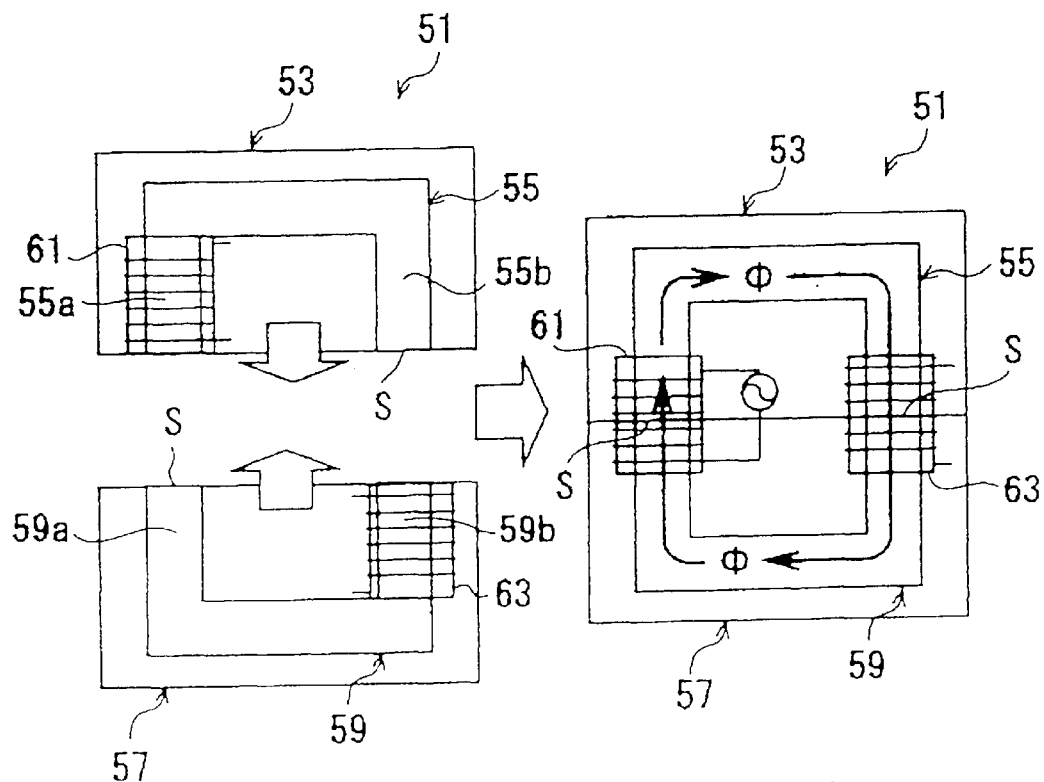
FIG. 4(A) and FIG. 4(B) are diagrams for explaining states where connectors of the electromagnetic induction connector according to a second embodiment of the invention have not been combined and have been combined, respectively.

FIG. 4(A) and FIG. 4(B) are diagrams for explaining states where connectors of the electromagnetic induction connector according to the second embodiment of the invention have not been combined and have been combined, respectively.

According to the second embodiment, an electromagnetic induction connector 51 is arranged in a manner that a primary core 55 housed within a primary connector 53 and a secondary core 59 housed within a secondary connector 57 are formed in the same shape. That is, the leg portions of the primary and secondary cores are formed to have the same protruded length. A primary coil 61 is wound around one leg portion 55a of the primary core 55, and the primary coil 61 is provided so as to move freely with respect to the leg portion 55a by means of a not-shown sliding mechanism. A secondary coil 63 is wound around the other leg portion 59b of the secondary core 59, and the secondary coil 63 is provided so as to move freely with respect to a leg portion 59b by means of a not-shown sliding mechanism.

As shown in FIG. 4(B), the primary coil 61 and the secondary coil 63 thus provided so as to move freely with respect to the leg portions are arranged to protrude from the leg portion 55a and the leg portion 59b so that these coils also can cover the tip end surfaces S of a leg portion 59a and a leg portion 55b of the partner side cores, respectively.

According to the electromagnetic induction connector 51 thus arranged, after coupling the connectors, the primary coil 61 and the secondary coil 63 are moved and protruded from the tip end surfaces to simultaneously cover the tip end surfaces S of the partner-side leg portions. Thus, it is not necessary to form the leg portions of each core to have the difference lengths. As a result, since the leg portions of each core can be formed to have the same protruded length, the coupling end surfaces of the primary connector 53 and the secondary connector 57 to be coupled can be formed as flat surfaces.

Figure 5:
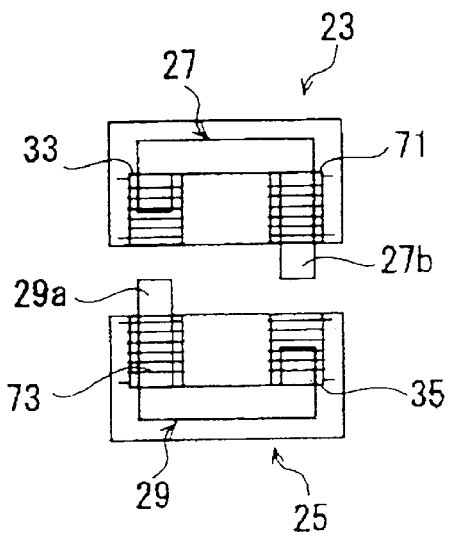
FIG. 5 is an explanatory diagram showing a modified example of the electromagnetic induction connector additionally provided with an electric power increasing coil according to the invention.

In order to increase the transmission electric power, as shown in FIG. 5, the electromagnetic induction connector may be arranged in a manner that an intensified primary coil 71 and an intensified secondary coil 73 for increasing electric power may be additionally provided at the leg portion 27b and the leg portion 29a around which no coil is wound, respectively.

Figure 6:
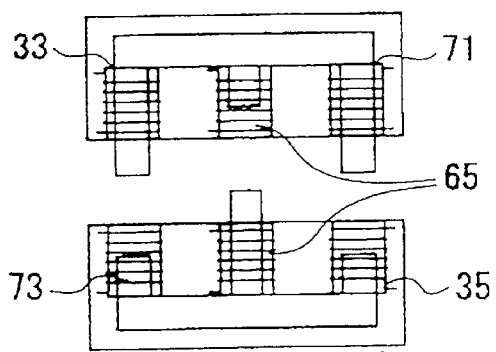
FIG. 6 is an explanatory diagram showing a modified example of the electromagnetic induction connector additionally provided with a magnetic flux monitoring coil according to the invention.
Figure 7:
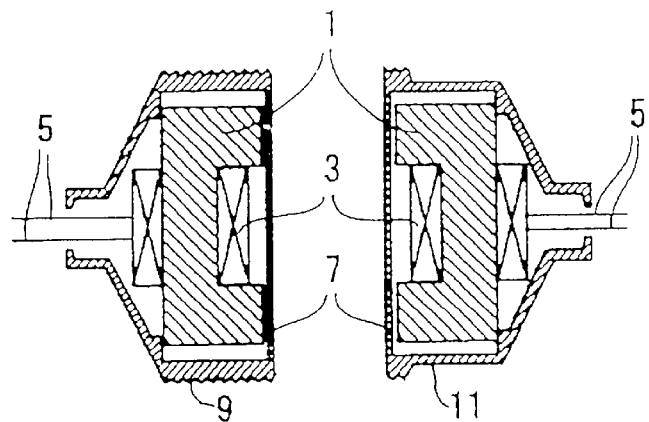
FIG. 7 is a sectional view of a conventional electromagnetic inductive coupling type connector.
Figure 8:
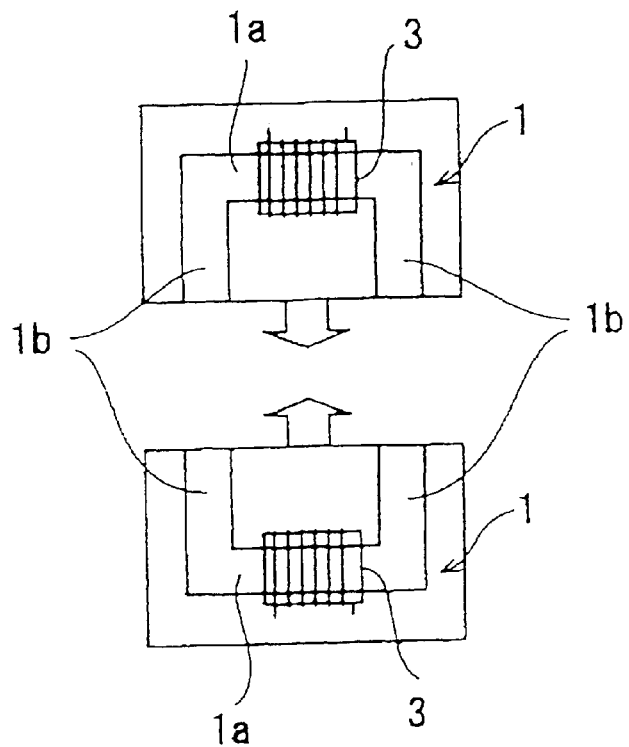
FIG. 8 is a perspective view of the conventional electromagnetic inductive coupling type connector.
Figure 9A:
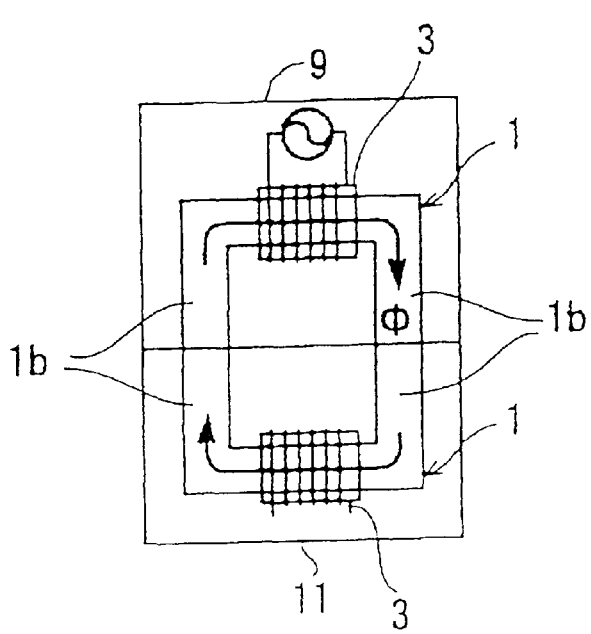
FIG. 9(A) and FIG. 9(B) are diagrams for explaining states where there is no deviation and there is a deviation between connectors of the electromagnetic induction connector of FIG. 9, respectively.
Figure 9B:
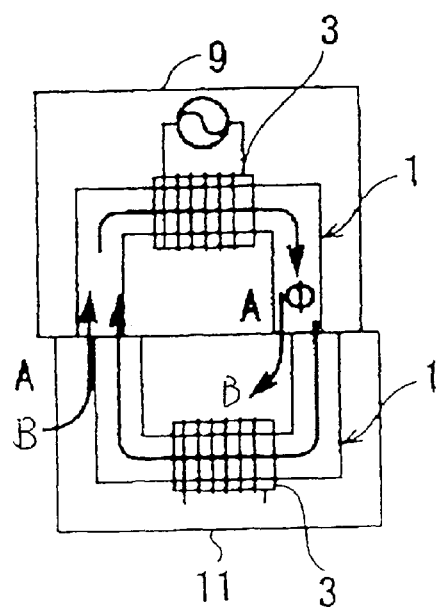

Further, each of the cores may be formed in a E-shape as shown in FIG. 6, for example, instead of the U-shape.

Furthermore, the electromagnetic induction connector may be arranged in a manner that magnetic flux monitoring coils 65 are additionally provided at the cores as shown in FIG. 6.

As described above in detail, according to the invention, the electromagnetic induction connector according to the invention is arranged in a manner that since the coils wound around the leg portions of the cores are provided so as to explode from the tip end surfaces of the leg portions, when the primary and secondary cores are disposed so as to oppose to each other upon coupling the connectors, the partner-side leg portions are inserted within the coils thus extended. Thus, the tip end surfaces of the leg portions disposed in opposite to each other are simultaneously surrounded by the coils. As a result, since the influence due to the leakage magnetic flux is reduced, the electromagnetic induction connector with a high efficiency can be obtained. Further, since the influence due to the leakage magnetic flux can be reduced without increasing the abutment accuracy, the manufacturing accuracy of the connectors may be low and so the manufacturing cost of the connector can be reduced.

What is claimed is:

1. An electromagnetic induction connector comprising:

a primary core including at least two first legs, each of said first legs defining a first tip end surface, wherein at least one of said first legs is longer than the other first leg(s);

a secondary core including at least two second legs, each of said second legs defining a second tip end surface opposed to a corresponding first tip end surface of said primary core wherein at least one of said second legs is longer than the other second leg(s);

a primary coil wound around one of said first legs and extending beyond the first tip end surface of the first leg around which it is wound to create a first recess operable to receive one of said second tip end surfaces of said secondary core;

a secondary coil wound around one of said second legs and extending beyond the second tip end surface of the second leg around which it is wound to create a second recess operable to receive one of said first tip end surfaces of said primary core;

a primary housing covering said primary core so that said first tip end surface of said longer first leg protrudes beyond a front surface of said primary housing and said first tip end surface of a shorter first leg remains behind said front surface of said primary housing; and a secondary housing covering said secondary core so that said second tip end surface of said longer second leg protrudes beyond a front surface of said secondary housing and said second tip end surface of a shorter second leg remains behind said front surface of said secondary housing.

2. An electromagnetic induction connector according to claim 1, further comprising an intensified primary coil wound around said longer first leg.

3. An electromagnetic induction connector according to claim 2, further comprising an intensified secondary coil wound around said longer second leg.

4. An electromagnetic induction connector according to claim 1, wherein said primary and secondary coils are offset from each other with respect to a plane, said plane being perpendicular to said first and second legs.

5. An electromagnetic induction connector according to claim 1, wherein said primary coil and said secondary coil covers half of each of the combined legs, each combined leg formed of one of said first legs and one of said second legs.

* * * * *